US007268273B2

(12) United States Patent
Chaney et al.

(10) Patent No.: US 7,268,273 B2
(45) Date of Patent: Sep. 11, 2007

(54) RECOVERING METALS FROM SOIL

(75) Inventors: Rufus L. Chaney, Beltsville, MD (US); J. Scott Angle, Ellicott City, MD (US); Yin-Ming Li, Potomac, MD (US); Alan J. M. Baker, S. Yorkshire (GB)

(73) Assignees: The University of Maryland, College Park, MD (US); The University of Sheffield, Sheffiedl (GB); The United States of America as represented by the Secretary of Agriculture, Washington, DC (US)

( * ) Notice: Subject to any disclaimer, the term of this patent is extended or adjusted under 35 U.S.C. 154(b) by 294 days.

(21) Appl. No.: 09/437,607

(22) Filed: Nov. 10, 1999

(65) Prior Publication Data

US 2002/0174451 A1 Nov. 21, 2002

Related U.S. Application Data

(63) Continuation-in-part of application No. 09/386,373, filed on Aug. 31, 1999, now abandoned, which is a continuation-in-part of application No. 08/879,813, filed on Jun. 20, 1997, now Pat. No. 5,944,872, which is a continuation of application No. 08/470,440, filed on Jun. 6, 1995, now Pat. No. 5,711,784.

(60) Provisional application No. 60/109,443, filed on Nov. 23, 1998, provisional application No. 60/107,797, filed on Nov. 10, 1998.

(51) Int. Cl.
*C22B 3/00* (2006.01)
*C22B 3/18* (2006.01)
*C22B 23/00* (2006.01)
*B09C 1/10* (2006.01)

(52) U.S. Cl. .................. 800/298; 75/710; 75/711; 75/712; 210/602; 210/681; 210/682

(58) Field of Classification Search ............... 800/260, 800/306, 298, 295; 75/710, 711, 712, 430; 210/602
See application file for complete search history.

(56) References Cited

U.S. PATENT DOCUMENTS

| 5,320,663 | A | | 6/1994 | Cunningham ................. 75/432 |
| 5,364,451 | A | | 11/1994 | Raskin et al. ................. 75/710 |
| 5,393,426 | A | | 2/1995 | Raskin et al. ................ 210/602 |
| 5,407,817 | A | | 4/1995 | Lightsey et al. ............. 435/165 |
| 5,571,703 | A | | 11/1996 | Chieffalo et al. ............ 435/105 |
| 5,711,784 | A | | 1/1998 | Chaney et al. ................ 75/712 |
| 5,728,300 | A | | 3/1998 | Kapulnik et al. ............ 210/602 |
| 5,779,164 | A | | 7/1998 | Chieffalo et al. ............. 241/17 |
| 5,785,735 | A | * | 7/1998 | Raskin et al. ................. 75/711 |
| 5,853,576 | A | | 12/1998 | Kapulnik et al. ........... 210/150 |
| 5,917,117 | A | | 6/1999 | Ensley et al. ................. 75/711 |
| 5,927,005 | A | | 7/1999 | Gardea-Torresdey et al. ............................. 47/58.1 |
| 5,928,406 | A | | 7/1999 | Salt et al. ...................... 75/712 |
| 5,944,872 | A | | 8/1999 | Chaney et al. ................ 75/712 |
| 6,786,948 | B1 | * | 9/2004 | Chaney et al. .............. 435/168 |

FOREIGN PATENT DOCUMENTS

| WO | WO 98/08991 | 3/1998 |
| WO | WO98/08991 | 3/1998 |

OTHER PUBLICATIONS

Brooks et al, "Some Observations on the ecology, metal uptake and nickel tolerance of *Alyssum serpyllifolium* subspecies from the Ierian peninsula", 1981 Vegetatio vol. 45 pp. 183-188.*
Salt et al. Biotechnology, vol. 13, pp. 468-474, 1995.*
Pollard et al. New Phytol. (1986), vol. 132, pp. 113-118.*
Baker etal. New Phytol. (1994), 127:61-68.*
Baker, A.J.M. et al., "The possibility of in situ heavy metal decontamination of polluted soils using crops of metal-accumulating plants," *Resources, Conservation and Recycling* 11:41-49 (1994).
Brooks et al., "Some observations on the ecology, metal uptake and nickel tolerance of *Alyssum serpyllifolium* subspecies from the Iberian peninsula", Vegetatio 45, p. 183-188 (1981).
Salt et al., "Phytoextraction: Present Applications and Future Promise", Bioremediation of Contaminated Soils, 42, pp. 729-743.
Baker, "Terrestial Higher Plants Which Hyperaccumulate Metallic Elements- A Review of Their Distribution, Ecology and Phytochemistry," *Biorecovery* 1:81-126 (1986).
Baker et al., "The Possibility of an in Situ Heavy Metal Decontamination of Polluted Soils Using Crops of Metal-accumulating Plants," *Resources. Conservation and Recycling* 11:41-49 (1994).
Bernstein, E., "Scientist Using Plants to Clean Up Metals in Contaminated Soil," *New York Times*, Sep. 8, 1992, p. C4.
Boyd, R.S. et al., "Nickel Hyperaccumulation Defends *Streptanthus polygaloides* (*Brassicaceae*) against Pathogens," *Am. J. Botany* 81:294-300 (Mar. 1994).
Brooks et al., "Detection of Nickeliferous Rocks by Analysis of Herbarium Specimens of Indicator Plants," *J. Geochem. Exploration* 7:49-57 (1977).
Brooks et al., "Nickel Accumulation by European Species of the Genus *Alyssum*," *Proc. R. Soc. Lond. B* 200:217-224 (1978).
Brooks et al., "Hyperaccumulation of Nickel by *Alyssum linnaeus* (*Cruciferae*)," *Proc. R. Soc. Lond. B.* 203:387-403 (1979).
Brooks et al., "Accumulation of Nickel by Terrestrial Plants," in *Nickel in the Environment*, J.O. Nriagu, ed., Wiley, New York, NY, pp. 407-430 (1980).

(Continued)

*Primary Examiner*—Medina A. Ibrahim
(74) *Attorney, Agent, or Firm*—Kramer & Amando, P.C.; Hans J. Crosby

(57) ABSTRACT

The invention relates to recovering metals, such as nickel and cobalt, by phytomining or phytoextracting soils rich in metals wherein the desired metal is selectively accumulated in hyperaccumulator plants by adjusting the soil pH. The metals are ultimately recovered from above-ground plant tissues at economically acceptable levels without further contaminating the metal-containing sites. The invention also relates to metal-hyperaccumulating plants.

20 Claims, No Drawings

OTHER PUBLICATIONS

Brooks et al., "Some Observation on the Ecology, Metal Uptake and Nickel Tolerance of *Alyssum serpyllifolium* Subspecies from the Iberian peninsula," *Vegetation* 45:183-188 (1981).

Brooks et al., "The Criminal Form and Physiological Function of Nickel in Some Iberian *Alyssum* Species," *Physiologia Plantarium* 51:167-170 (1981).

Cunningham, S.D. et al., "Phytoremediation of contaminated soils," *TibTech* 13:393-397 (Sep. 1995).

de Varennes et al., "Effect of Heavy Metals on the Growth and Mineral Composition of a Nickel Hyperaccumulator," *J. Plant Nutr.* 19:669-676 (1996).

Gabbrielli, R. et al., "Accumulation Mechanisms and Heavy Metal Tolerance of a Nickel Hyperaccumulator," *J. Plant Nutr.* 14:1067-1080 (1991).

Gambi et al., "Some Aspects of the Metabolism of *Alyssum bertolonii* Desv.," pp. 319-329, Abstract (1992).

Gambi et al., "Investigation on a Nickel Accumulating Plant: '*Alyssum bertolonii*' Desv. I., Nickel, Calcium and Magnesium Content and Distribution During Growth," *Webbia Abstract* 32:175-188 (May 1998).

Homer et al., "Characterization of the Nickel-rich Extract from the Nickel Hyperaccumulator Dichapetalum Geloniodes," *Phytochem.* 30:2141-2145 (1991).

Homer et al., "Comparative Studies of Nickel, Cobalt and Copper Uptake by Some Nickel Hyperaccumulators of the Genus *Alyssum*," *Plant and Soil* 138:195-205 (1991).

Huang, J.W. and S.D. Cunningham, "Lead phytoextraction: species variation in lead uptake and translocation," *New Phytol.* 134:75-84 (Sep. 1996).

Kruckeberg, A.R. et al., "Hyperaccumulation of Nickel by *Arenaria rubella* (*Caryophyllaceae*) from Washington State," *Madrono West Amer. J. Bot.* 40:25-30 (Jan.-Mar. 1993).

Kruckeberg, A.R. and R.D. Reeves, "Nickel Accumulation by Serpentine Species of *Streptanthus* (*Brassicaceae*): Field and Greenhouse Studies," *Madrono* 42:458-469 (Oct.-Dec. 1995).

Lasat, M.M. et al., "Physiological Characterization of Root $Zn^{2+}$ Absorption and Translocation to Shoots in Zn Hyperaccumulator and Nonaccummulator Species of Thlaspi," *Plant Physiol.* 112:1715-1722 (Dec. 1996).

Martens, S.N. and R.S. Boyd, "The ecological significance of nickel hyperaccumulation: a plant chemical defense," *Oecologia* 98:379-384 (Aug. 1994).

Morrison et al., "Nickel Uptake by *Alyssum* Species," *Plant Sci. Letters* 17:451-457 (1980).

Pollard, A.J. and A.J.M. Baker, "Quantitative genetics of zinc hyperaccumulation in *Thlaspi caerulescens*," *New Phytol.* 132:113-118 (Jan. 1996).

Pollard, A.J. and A.J.M. Baker, "Deterrence of herbivory by zinc hyperaccumulation in *Thlaspi caerulescens*(*Brassicaceae*)," *New Phytol.* 135:655-658 (Apr. 1997).

Reeves et al., "Uptake of Nickel by Species of *Alyssum, Bornmuellera*, and Other Genera of Old World *Tribus alysseae*," *Taxon* 32:187-192 (May 1983).

Reeves, "The Hyperaccumulation of Nickel by Serpentine Plants," in *The Vegetation of Ultramafic (Serpentine) Soils: Proceedings of the First International Conference of Serpentine Ecology*, pp. 253-277 (1991).

Robinson et al., "The Nickel Hypeaccumulator Plant *Alyssum bertolonii* as a Potential Agent for Phytoremediation and Phytomining of Nickel," *J. Geochem. Exploration* 59:75-86 (1997).

Sagner, S. et al., "Hyperaccumulation, Complexation and Distribution of Nickel in *Sebertia acuminata*," *Phytochem.* 47:339-347 (Feb. 1998).

Salt et al., "Phytoremediation : A Novel Strategy for the Removal of Toxic Metals from the Environment Using Plants," *Biotechnol.* 13:468-473 (May 1995).

Shen, Z.G. et al., "Uptake and transport of zinc in the hyperaccumulator *Thlaspi caerulescens* and the non-hyperaccumulator *Thlaspi ochroleucum*," *Plant Cell Environ.* 20:898-906 (Jul. 1997).

Tichý, R. et al., "Use of elemental sulphur to enhance a cadmium solubilization and its vegetative removal from contaminated soils," *Nutrient Cycling Agroecosyst.* 46:249-255 (1997).

Tilstone, G.H. and M.R. Macnair, "The Consequence of Selection for Copper Tolerance on the Uptake and Accumulation of Copper in *Mimulus guttatus*," *Ann. Bot.* 80:747-751 (Dec. 1997).

Tolré, R.P. et al., "Zinc Hyperaccumulation in *Thlaspi caerulescens*. II. Influence on Organic Acids," *J. Plant Nutr.* 19:1541-1550 (1996).

Nanda Kumar, P.B.A. et al., "Phytoextraction: The Use of Plants To Remove Heavy Metals from Soils," *Environ. Sci. & Technol.* 29:1232-1238 (1995).

Raskin, I. et al., "Bioconcentration of heavy metals by plants," *Curr. Opin. Biotechnol.* 5:285-290 (1994).

Robinson, B.H. et al., "Soil Amendments Affecting Nickel and Cobalt Uptake by *Berkheya coddii*: Potential Use for Phytomining and Phytoremediation," *Annals of Botany* 84:689-694 (1999).

Romero, F. et al., "Metal Plant and Soil Pollution Indexes," *Water. Air. and Soil Pollution* 34:347-352 (1987).

BoDD (Botanical Dermatology Database), <http://www.uwcm.ac.uk//uwcm/dm/BoDD/BotDermFolder/BotDermC> (visited Aug. 25, 1999).

A.J.M. Baker & R.R. Brooks; Biorecovery, vol. 1. (1989) pp. 81-126; "Terrestrial Higher Plants which Hyperaccumulate Metallic Elements—A Review of their Distribution, Ecology and Phytochemistry".

* cited by examiner

RECOVERING METALS FROM SOIL

CROSS-REFERENCE TO RELATED APPLICATIONS

This application is a continuation-in-part of U.S. application Ser. No. 09/386,373, filed Aug. 31, 1999, now abandoned, which is a continuation-in-part of U.S. application Ser. No. 08/879,813, filed Jun. 20, 1997, now U.S. Pat. No. 5,944,872, which is a continuation of U.S. Ser. No. 08/470,440, filed Jun. 6, 1995, now U.S. Pat. No. 5,711,784, and this application claims priority to U.S. Provisional Application Nos. 60/109,443, filed Nov. 23, 1998, and No. 60/107,797, filed on Nov. 10, 1998. U.S. Pat. Nos. 5,711,784 and 5,944,872, and U.S. Provisional Application Nos. 60/107,797 and 60/109,443 are herein incorporated by reference.

STATEMENT AS TO RIGHTS TO INVENTIONS MADE UNDER FEDERALLY-SPONSORED RESEARCH AND DEVELOPMENT

Part of the work performed during development of this invention utilized U.S. Government funds. The U.S. Government has certain rights in this invention.

BACKGROUND OF THE INVENTION

1. Field of the Invention

This invention pertains to methods for recovering metals, such as nickel and cobalt, from metal-rich soil using phytoextracting or phytomining techniques. Metals can be selectively extracted from soil by cultivating certain metal hyperaccumulating plants, such as *Alyssum* plants, on soil treated to adjust the pH.

2. Related Art

Industrial practices such as mining, smelting and disposing of manufacturing wastes have increased the concentrations of toxic metals in the environment. For example, at many nickel mining and smelting sites, levels of nickel and cobalt in soil have become so high that few plants survive, resulting in severe disruption of local ecosystems. Once nickel and cobalt enter soil, their removal is difficult since they are relatively immobile and they do not degrade into less toxic substances. The size of the areas affected by smelter and mine wastes are usually so large that engineering methods of soil remediation, such as soil removal and replacement, are too expensive to be practical (Cunningham et al., "Phytoremediation of Contaminated Soils," *Trends Biotechnol.* 13: 393-397 (1995)).

The ability of certain plants to grow in metal-containing or metal-contaminated soil, and to actively accumulate heavy metals in their tissues, has created an interest in using such plants to extract metals from soil. Growing plants, including crops, on contaminated soil to extract contaminants is referred to as phytoextraction. This method is particularly effective in arable contaminated soils because it causes little disruption or dispersal, while preserving soil fertility and landscapes.

Nickel is one of the most widely found, and technologically important metals. It is a natural constituent in all soils, being particularly high in concentration in certain types of soil and geological materials such as serpentine, lateritic serpentine, ultramafic and meteor-derived soils. Cobalt, another valuable metal, has chemical and geological characteristics very similar to nickel and is generally found in the same soils. Other metals that may be found in such soils include those of the platinum and palladium families such as palladium, rhodium, ruthenium, platinum, iridium, osmium and rhenium, and metals such as selenium, zinc and cadmium.

Sites containing serpentine, lateritic serpentine, ultramafic and meteor-derived soils and materials can be conventionally mined or cultivated with metal-accumulating plants. Using such plants to extract metals from mineralized (geogenic) soils is referred to as phytomining.

U.S. Pat. No. 5,364,451 to Raskin et al., is directed to a method of remediating polluted soils at a reduced cost. Raskin et al. remove metals from metal-rich soil by growing plants of the family Brassicaceae in the metal-rich soil. While Raskin et al. generally describe a variety of plants and a large number of metals that may be recovered, the examples mainly describe the recovery of chromium and lead from genetically altered plants. Thus, although promising, Raskin et al. offer little basis for an opportunity to proceed directly with soil phytomining or phytoextraction through plant growth or cultivation.

U.S. Pat. No. 5,785,735 to Raskin et al., is also directed to methods of remediating polluted soils. Raskin et al. remove metals from metal-rich soil by growing crop and crop-related members of the plant family Brassicaceae in the metal-rich soil. The methods require the formation of a complex between the metal and a chelating agent added to the soil, the application of an electric field to the soil or a reduction in the pH of the soil. While Raskin et al. generally describe a variety of plants, the specification mainly describes the recovery of metals from genetically altered plants. Thus, again, Raskin et al. offer little basis for an opportunity to proceed directly with soil phytomining or phytoextraction through plant growth or cultivation.

Scientists recognize that increasing the pH of soil decreases the ability of farm crops to take-up heavy metals. U.S. Pat. No. 5,711,784 to Chaney et al. reflects the belief in the art that reducing the pH of the soil "increases the phytoavailability of nickel and cobalt." As disclosed by Chaney et al., a "reduced pH increases solubility, and optimizes the release of these metals for absorption by the roots and translocation to the above-ground tissues of the plant." However, reducing the pH of the soil also renders the metals more mobile and may allow for further contamination of the site. Therefore, cultivating plants which are hyperaccumulators of nickel, cobalt and other metals through phytoextraction or phytomining, is a desirable alternative as a means for recovering such metals.

SUMMARY OF THE INVENTION

Accordingly, this invention relates to improved systems for recovering metals by phytomining or phytoextracting soils rich in metals.

The invention further relates to increasing nickel uptake by plants used in phytomining and phytoextraction by elevating the soil pH. Nickel is ultimately recovered from plant tissues at economically acceptable levels without further contaminating the nickel-containing site.

The invention further relates to lowering the pH in soils prior or subsequent to nickel recovery to collect, for example, cobalt or any other metal present in the metal-laden soil.

In a particular aspect of the invention, *Alyssum* plants are cultivated under favorable pH conditions to selectively accumulate certain metals relative to other metals.

The invention further relates to a method for selectively increasing the amount of at least one metal recovered from metal-containing soil comprising:

(a) elevating or lowering the pH of the soil;
(b) cultivating at least one metal-hyperaccumulator plant in the soil under conditions sufficient to permit said at least one plant to accumulate at least one metal from the soil in above-ground tissue;
(c) elevating the pH of the soil if the pH was lowered in step (a) or lowering the pH of the soil if the pH was elevated in step (a); and
(d) cultivating the at least one metal-hyperaccumulator plant in the soil under conditions sufficient to permit said at least one plant to accumulate at least one second metal from the soil in above-ground tissue.

The invention further relates to a method for recovering nickel from nickel-containing soil comprising:
(a) elevating the pH of the soil;
(b) cultivating at least one nickel-hyperaccumulator plant in the soil under conditions such that at least 0.1% of the above-ground tissue of said at least one plant, on a dry weight basis, is nickel;
(c) harvesting said at least one plant; and
(d) recovering nickel from said harvested plant.

The invention further relates to a method for recovering cobalt from cobalt-containing soil comprising:
(a) lowering the pH of the soil;
(b) cultivating at least one cobalt-hyperaccumulator plant in the soil under conditions such that at least 0.1% of the above-ground tissue of said at least one plant, on a dry weight basis, is cobalt;
(c) harvesting said at least one plant; and
(d) recovering cobalt from said harvested plant.

The invention further relates to the identification of new hyperaccumulating species of *Alyssum* whereby collected plants are screened by comparing nickel-uptake by the plants to nickel-uptake by the bench-mark nickel-hyperaccumulator *A. murale* 103. These new metal-hyperaccumulating species, cultivated on nickel-containing soil, accumulate nickel in above-ground tissue at a concentration of 1.55% or greater by weight based on the gross dry weight of the tissue.

The invention further relates to seeds of the *Alyssum* plant species.

The invention further relates to pollen of the *Alyssum* plant species.

The invention further relates to plants that have all the physiological and morphological characteristics of the *Alyssum* plant species.

The invention further relates to propagation material of the *Alyssum* plant species.

The invention further relates to a method for decontaminating metal-containing soil, comprising cultivating at least one hyperaccumulator plant in metal-containing soil, whereby the concentration of metal in the above-ground plant tissue of the at least one hyperaccumulator plant exceeds the concentration of metal in the soil by a factor of at least 2.

DETAILED DESCRIPTION OF THE PREFERRED EMBODIMENTS

In the present invention, it was discovered that certain metals can be selectively recovered from metal-rich soil using phytoextraction or phytomining techniques employing plants classified as hyperaccumulators of metals. By cultivating selected plants on metal-containing soil, the metals absorbed by the roots can be translocated to above-ground tissues, such as the stems, leaves, flowers and other leaf and stem tissues. This feature facilitates recovery of the metal extracted from the soil. Metal concentrations can be as high as about 5.0% in above-ground plant tissues, when leaves are included, which renders the metal recovery very economical. However, recovering metal in concentrations of less than about 5.0%, such as about 4.0%, 3.0%, 2.5%, 1.0% or 0.1% remains useful. For example, a recovery of about 1.0% or more offers economic return for decontaminating polluted soil and for phytomining. A recovery of about 0.1% to about 1.0% of cobalt is sufficient to decontaminate polluted soil at a low cost, and a recovery of even less than about 0.1% of some metals can still effectively decontaminate polluted soils.

The invention further relates to a method for selectively increasing the amount of at least one metal recovered from metal-containing soil comprising:
(a) elevating or lowering the pH of the soil;
(b) cultivating at least one metal-hyperaccumulator plant in the soil under conditions sufficient to permit said at least one plant to accumulate at least one metal from the soil in above-ground tissue;
(c) elevating the pH of the soil if the pH was lowered in step (a) or lowering the pH of the soil if the pH was elevated in step (a); and
(d) cultivating the at least one metal-hyperaccumulator plant in the soil under conditions sufficient to permit said at least one plant to accumulate at least one second metal from the soil in above-ground tissue.

The invention further relates to a method for recovering nickel from nickel-containing soil comprising:
(a) elevating the pH of the soil;
(b) cultivating at least one nickel-hyperaccumulator plant in the soil under conditions such that at least 0.1% of the above-ground tissue of said at least one plant, on a dry weight basis, is nickel;
(c) harvesting said at least one plant; and
(d) recovering nickel from said harvested plant.

The invention further relates to a method for recovering cobalt from cobalt-containing soil comprising:
(a) lowering the pH of the soil;
(b) cultivating at least one cobalt-hyperaccumulator plant in the soil under conditions such that at least 0.1% of the above-ground tissue of said at least one plant, on a dry weight basis, is cobalt;
(c) harvesting said at least one plant; and
(d) recovering cobalt from said harvested plant.

The invention further relates to the identification of new hyperaccumulating species of *Alyssum* whereby collected plants are screened by comparing nickel-uptake by the plants to nickel-uptake by the bench-mark nickel-hyperaccumulator *A. murale* 103. These new metal-hyperaccumulating species, cultivated on nickel-containing soil, accumulate nickel in above-ground tissue at a concentration of 1.55% or greater by weight based on the gross dry weight of the tissue.

The invention further relates to seeds of the *Alyssum* plant species.

The invention further relates to pollen of the *Alyssum* plant species.

The invention further relates to plants that have all the physiological and morphological characteristics of the *Alyssum* plant species.

The invention further relates to propagation material of the *Alyssum* plant species.

The invention further relates to a method for decontaminating metal-containing soil, comprising cultivating at least one hyperaccumulator plant in metal-containing soil, whereby the concentration of metal in the above-ground plant tissue of the at least one hyperaccumulator plant exceeds the concentration of metal in the soil by a factor of at least 2, preferably by a factor of 2, 3 or 4.

In a preferred aspect of the invention, nickel is selectively accumulated by growing one or more nickel-hyperaccumulating plants in metal-rich, e.g., nickel-rich, soil and elevating the pH of the soil. The pH of the soil may be elevated before, during or after the plants are cultivated. Preferably, the pH is elevated prior to plant cultivation. Thus, the invention relates to the surprising discovery that raising the pH of the metal-rich soil favors nickel accumulation in plant tissue over other metals. The soil pH can then be lowered to selectively accumulate, in the plant tissue, other metals such as cobalt. The preferred pH will depend, inter alia, upon the particular metal and the soil. For example, the preferred pH for nickel extraction ranges between about 6.3 and about 7.0 when the soil is a serpentine soil or when the soil contains high iron oxide levels. The most preferred pH ranges from about 6.3 to about 6.7. However, when the iron oxide level is low, a more alkaline pH may be used.

Cobalt extraction is also affected by the soil chemistry. For example, the most preferred pH for cobalt extraction is about 5.5 when aluminum and/or manganese are present in the soil. For metal extraction in general, the preferred pH ranges between about 5.5 and about 7.0.

Soil pH can be raised and lowered with bases and acids. Such bases and acids may be either naturally occurring or synthetic. To raise the pH, bases such as limestone (calcitic ($CaCO_3$) or dolomitic ($CaMgCO_3$)), lime (CaO), hydrated lime ($Ca(OH)_2$), industrial, municipal or agricultural alkaline by-products that contain any of the above bases or a limestone equivalent, or the like can be used. The phrase "limestone equivalent" is intended to encompass bases that have the same alkalinity as limestone. To lower the pH, acids such as organic and inorganic acids can be used. Examples of such organic and inorganic acids include acetic acid, aqueous hydrogen chloride, aqueous sulfuric acid, sulfur, ammonium, urea-containing fertilizers, nitric acid, sulfide minerals, including, but not limited to, pyrite, and the like.

The amount of base or acid to add depends upon the existing pH of the soil and the soil chemistry. Methods used to determine the amount include, but are not limited to, adding acid or a base, such as $CaCO_3$, to the soil sample and measuring the resulting pH, then drawing a pH response curve to extrapolate the amount needed to obtain the desired pH.

After cultivation, the hyperaccumulator plant is harvested in a conventional fashion, i.e., by cutting the plant at soil level. The harvested materials are then left to dry in the field in the manner in which hay is dried. Alternatively, the harvested materials are dried in much the same fashion that alfalfa is dried, so as to remove most of the water present in the plant tissue by forced heated air drying. After drying, the plant tissue is collected by normal agricultural practices of hay-making, incinerated and reduced to an ash with or without energy recovery. Alternatively, the dried plant material may be hydrolyzed with concentrated acid to produce sugars and the metals recovered according to U.S. Pat. Nos. 5,407,817, 5,571,703 and 5,779,164. The sugars may then be fermented to produce ethanol.

The resulting dried plant material may alternatively be further treated by known roasting, sintering or smelting methods which allow the metals in the ash or ore to be recovered according to conventional metal refining methods such as acid dissolution and electrowinning.

Conventional smelting, roasting and sintering temperatures from about 260° C. to about 1000° C. are sufficient to combust the dried plant material to oxidize and vaporize the organic material present and to prevent dioxin accumulation during incineration. The preferred temperature is sufficient to remove the organic carbon to free the ash. The most preferred temperature is about 1000° C. The process leaves a residue of the accumulated metal with few contaminants known to interfere with metal refining. Further, it is expected that the concentration of other components in the ash will be much lower than with conventional mined ore concentrates. For example, serpentine laterite ores generally contain over 10,000 ppm (1%) Fe whereas a biomass obtained using phytomining techniques only contains about 100-500 ppm (0.01-0.05%) Fe.

By definition, nickel-hyperaccumulating plants accumulate at least about 1000 mg of nickel per 1 kg dry weight of plant tissue (obtained from a plant grown in soil where the plant naturally occurs). Similarly, cobalt-hyperaccumulating plants are defined as plants that accumulate at least about 1000 mg of cobalt per 1 kg dry weight of plant tissue (obtained from a plant grown in soil where the plant naturally occurs). However, zinc- and manganese-hyperaccumulators are defined as plants that accumulate at least about 10,000 mg of zinc and manganese, respectively, per 1 kg dry weight of plant tissue (obtained from a plant grown in soil where the plant naturally occurs). Finally, cadmium-hyperaccumulators are defined as plants that accumulate at least about 100 mg cadmium per 1 kg dry weight of plant tissue (obtained from a plant grown in soil where the plant naturally occurs).

By screening a wide variety of plants, those of the *Alyssum* genus (Brassicaceae family) have been identified as hyperaccumulators of nickel. These plants also naturally accumulate cobalt and may accumulate metals such as Zn, Mn and Cd, and metals from the platinum and palladium families including Pd, Rh, Ru, Pt, Ir, Os and Re.

More specifically, plants which naturally concentrate nickel in above-ground tissues and generally exhibit an enhanced uptake of cobalt and other metals include members of the section Odontarrhena of the genus *Alyssum*. The metals accumulate in nickel-hyperaccumulating *Alyssum* plant species when the plants are grown in contaminated soils. Some 48 taxa within the section Odontarrhena of the genus *Alyssum* are known to be hyperaccumulators of nickel. These include the following species: *A. akamasicum, A. alpestre, A. anatolicum, A. callichroum, A. cassium, A. chondrogynum, A. cilicicum, A. condensatum, A. constellatum, A. crenulatum, A. cypricum, A. davisianum, A. discolor, A. dubertretii, A. eriophyllum, A. euboeum, A. floribundum, A. giosnanum, A. hubermorathii, A. janchenii, A. markgrafii, A. masmenaeum, A. obovatum, A. oxycarpum, A. penjwinensis, A. pinifolium, A. pterocarpum, A. robertianum, A. samariferum, A. singarense, A. smolikanum, A. syriacum, A. trapeziforme, A. troodii, A. virgatum, A. murale, A. pintodasilvae* (also known as *A. serpyllifolium* var. *lusitanicum*), *A. serpyllifolium, A. malacitanum* (also known as *A. serpyllifolium* var. *malacitanum*), *A. lesbiacum, A. fallacinum, A. argenteum, A. bertolonii, A. tenium, A. heldreichii, A. corsicum, A. pterocarpum* and *A. caricum* as well as newly discovered species such as *A. corsicum* G16, *A. murale* G69 and *A. murale* G82. These species were deposited on Nov. 6, 1998, under the provisions of the Budapest Treaty at the American Type Culture Collection, 10801 University Blvd., Manassas, Va. 20110-2209, and assigned ATCC nos. 203436, 203437 and 203438, respectively.

Species of *Alyssum* that naturally accumulate nickel in amounts of up to 20% greater than any known *Alyssum* hyperaccumulator have been isolated. Species *A. murale*

G49, *A. murale* G54, *A. murale* G69 and *A. murale* G82 isolated in Greece and species *A. corsicum* G16 isolated in Turkey all accumulate nickel in amounts greater than the known species *A. murale* 103 which accumulates nickel such that nickel makes up 1.14% by dry weight of a plant shoot from a test field of serpentine soil. The new hyperaccumulators accumulate nickel in amounts such that 1.55-1.60% by dry weight of the shoot is nickel. The results of nickel accumulation of these five new accumulators relative to the benchmark accumulator *A. murale* 103 is shown in Example 4.

About 250 other plant taxa, including those of tropical origin, have been shown to accumulate quantities of nickel and other metals. However, many of these plants do not exceed about 10,000 mg of metal per kg of plant tissue dry weight. Other metal-accumulating plants includes species of the genus *Cyanotis* such as *Cyanotis longifolia*; species of the genus *Bulbostylis* such as *Bulbostylis mucronata*; species of the genus *Combretum* such as *Combretum decandrum*; species of the genus *Crassula* such as *C. alba, C. vaginata* and *C. argyrophylla*; species of the genus *Clethra* such as *Clethra barbinervis*; plants from the Cunoniaceae family such as species of the genus *Geissois* including *G. intermedia, G. magnifica, G. montana, G. pruinosa, G. trifoliata* and *G. racemosa*; species of the genus *Argophyllum*; members of Brassicaceae family such as species of the genus *Thlaspi* such as *Thlaspi caerulescens, Thlaspi montanum* var. *montanum* and *Thlaspi montanum* var. *siskiyouense*; species of the genus *Serpentine* such as *Serpentine polygaloides*; species of the genus *Sebertia* such as *Sebertia acuminata*; species of the genus *Hybanthus* such as *Hybanthus floribundas*; species of the genus *Psychotria* such as *Psychotria douarrei*; species of the genus *Rinorea* such as *Rinorea bengalensis*; species of the genus *Pearsonia* such as *Pearsonia metallifera*; species of the genus *Sebertia* such as *Sebertia acuminata*; and species of the following genera: *Homalium, Myristica, Trichospermum, Planchonella* and *Peltaria*. Additional plants include, but are not limited to, *Streptanthus polygaloides, Berkheya coddii, Phyllanthus palawanensis, Dichapetalum gelonioides* ssp. *tuberculatum* and *Stackhousia tryonii*.

Additional metal hyperaccumulators are listed below:

Acanthaceae
*Blepharis acuminata, Justicia lanstyakii, Lophostachys villosa, Phidiasia lindavii, Ruellia geminiflora*

Adiantaceae
*Adiantum* sp.

Anacardiaceae
*Rhus wildii*

Asteraceae
*Berkheya coddii*, Chromolaena sp. cf. *meyeri, Dicoma niccolifera, Gochnatia crassifolia, G. recurva, Koanophyllon grandiceps, K. prinodes, Leucanthemopsis alpina, Pentacalia, Senecio Seneciopauperculus, Shaferaplatyphylla, Solidago hispida*

Boraginaceae
*Heliotropium* sp.

Brassicaceae
*Bornmuellera, Cardamine resedifolia, Cochlearia aucheri, C. sempervivum, Peltaria emarginata, Streptanthus polygaloides*

Buxaceae
*Buxus*

Campanulaceae
*Campanula scheuchzeri, Arenaria, Minuartia laricifolia, M. verna*

Clusiaceae
*Garcinia bakeriana, G. polyneura, G. revoluta, G. ruscifolia*

Convolvulaceae
*Merremia xanthophylla*

Cunoniaceae
*Pancheria engleriana*

Dichapetalaceae
*Dichapetalum gelonioides* and ssp. *tuberculatum* and ssp. *andamanicum*

Dipterocarpaceae
*Shorea tenuiramulosa*

Escalloniaceae
*Argophyllum grunowii, A. laxum*

Euphorbiaceae
*Baloghia* sp., *Bonania, Cleidion viellardii, Cnidoscolus* sp. cf. *bahianus, Euphorbia, Gymnanthes recurva, Leucocroton, Phyllanthus, Sapium erythrospermum, Savia*

Fabaceae
*Anthyllis* sp., *Pearsonia metallifera, Trifolium pallescens*

Flacourtiaceae
*Casearia silvana, Homalium, Xylosma*

Juncaceae
*Luzula lutea*

Meliaceae
*Walsura monophylla*

Myristicaceae
*Myristica laurifolia*

Myrtaceae
*Mosiera araneosa, M. ekmanii, M. x miraflorensis, M. ophiticola, Psidium araneosum, P. havanense*

Ochnaceae
*Brackenridgea palustris* and ssp.*foxworthyi* and ssp. *kjellbergii, Ouratea nitida, O. striata*

Oleaceae
*Chionanthus domingensis*

Oncothecaceae
*Oncotheca balansae*

Poaceae
*Trisetum distichophyllum*

Ranunculaceae
*Ranunculus glacialis*

Rubiaceae
*Ariadne shaferi* ssp. *shaferi* and ssp. *moaensis, Mitracarpus* sp., *Phyllomelia coronata, Psychotria clementis, P. costivenia, P. douarrei, P. glomerata, P. osseana, P. vanhermanii, Rondeletia*

Sapotaceae
*Planchonella oxyedra, Sebertia acuminata*

Saxifragaceae
*Saxifraga*

Scrophulariaceae
*Esterhazya* sp. and *Linaria alpina*

Stackhousiaceae
*Stackhousia tryonii*

Tiliaceae
*Tetralix brachypetalus, T. cristalensis, T. jaucoensis, T. moaensis, T. nipensis, Trichospermum kjellbergii*

Turneraceae
*Turnera subnuda*

Velloziaceae
*Vellozia* sp.

Violaceae
*Agatea deplanchei, Hybanthus, Rinorea bengalensis, R. javanica, Rinorea* sp.

Aceraceae
*Acer pseudoplatanus*

Brassicaceae
*Cardaminopsis halleri, Thlaspi avalanum, T. brachypetalum, T. caerulescens, T. ochroleucum, T. rotundifolium* subsp. *cepaeifolium, T. praecox, T. stenopterum, T. tatrense*

Caryophyllaceae
*Minuartia verna, Polycarpaea synandra*

Cistaceae
*Cistus incanus* ssp. *creticus*

Dichapetalaceae
*Dichapetalum gelonioides*

Plumbaginaceae
*Armeria maritima* var. *halleri*

Poaceae
*Agrostis stolonifera, A. tenuis, Arrhenatherum elatius, Festuca ovina*

Polygonaceae
*Rumex acetosa*

Violaceae
*Viola calaminaria*

Amaranthaceae
*Pandiaka metallorum, Celosia trigyna*

Asteraceae
*Anisopappus chinensis, A. davyi, Gutenbergia pubescens, Millotia myosotidifoliab, Vernonia petersii*

Caryophyllaceae
*Minuartia verna* ssp. *hercynica* and *Silene cobalticola*

Commelinaceae
*Commelina zigzag* and *Cyanotis longifolia*

Convolvulaceae
*Ipomoea alpina*

Crassulaceae
*Crassula alba* and *C. vaginata*

Cyperaceae
*Ascolepis metallorum, Bulbostylis cupricola, B. pseudoperennis*

Euphorbiaceae
*Monadenium cupricola* and *Phyllanthus williamioides*

Fabacaeae
*Crotalaria cobalticola* and *Vigna dolomitica*

Iridaceae
*Gladiolus gregarius*

Lamiaceae
*Aeollanthus subacaulis* var. *linearis, A. homblei, A. saxatilis, A. subacaulis* var. *ericoides* and var. *linearis, Becium grandiflorum* var. *vanderystii, Haumaniastrum homblei, H. katangense, H. robertii, H. rosulatum*

Malvaceae
*Hibiscus rhodanthus*

Pinaceae
*Abies balsamea*

Poaceae
*Eragrostis racemosa, Rendlia altera, Sporobolus congoensis*

Pteridaceae
*Actiniopteris* sp.

Scrophulariaceae
*Alectra sessiliflora* var. *senegalensis, Buchnera henriquesii, Crepidorhopalon tenuisa, C. perennisa, Sopubia mannii, S. metallorum, S. neptunii, Striga hermontheca*

Tiliaceae
*Triumfetta dekindtiana, T. digitata, T. welwitschii* var. *descampii*

Velloziaceae
*Xerophyta retinervis* var. *equisetoides*

Apocynaceae
*Alyxia rubricaulis*

Celastraceae
*Maytenus bureaviana, M. pancheriana, M. sebertiana*

Clusiaceae
*Garcinia amplexicaulis*

Myrtaceae
*Eugenia clusioides*

Proteaceae
*Beaupreopsis paniculata, Macadamia angustifolia, M. neurophylla*

Asteraceae
*Haplopappus fremontii, Machaeranthera glabriuscula, M. ramosa, M. venusta*

Brassicaceae
*Stanleya pinnata, S. bipinnata*

Chenopodiaceae
*Atriplex confertifolia*

Lecythidaceae
*Lecythis ollaria*

Leguminosae
*Acacia cana, Astragalus bisulcatus, A. osterhoutii, A. pattersonii, A. pectinatus, A. racemosus, Neptunia amplexicaulis*

Rubiaceae
*Morinda reticulata*

Scrophulariaceae
*Castilleja chromosa*

The metals accumulated include nickel, cobalt, barium, gold, beryllium, mercury, molybdenum, copper, arsenic, selenium, antimony, manganese, silver, thallium, tin, lead, rubidium, chromium, cerium, vanadium, cesium, uranium, plutonium, strontium, yttrium, technetium, iridium, ruthenium, palladium, rhodium, platinum, osmium, rhenium, zinc and cadmium.

Metal sequestration can be improved by optimizing soil calcium concentration, using ammonium-containing or ammonium-generating fertilizers rather than other nitrate-containing fertilizers, and by applying chelating agents to the soil in which the hyperaccumulator plants are grown.

*Alyssum* species which hyperaccumulate metals such as nickel and cobalt evolved in nickel-rich ultramafic and serpentine soils which have low soil calcium and a low Ca:Mg ratio. It is now known that the presence of extremely low and extremely high calcium concentrations in soil inhibits nickel hyperaccumulation by *Alyssum*. See PCT/US97/15109. Acceptable calcium concentrations in soil range from about 0.128 mM to about 5.0 mM. In terms of percentages, an acceptable calcium concentration in soil ranges from about 2% to about 80% of the exchangeable cations. A preferable range is from about 10% to about 80% of the exchangeable cations. The most preferred range is from about 30% to about 70% of the exchangeable cations. Such ranges can be achieved, if necessary, by adding calcium-containing agents to the soil such as limestone. In addition, gypsum could be added to the soil to raise the exchangeable calcium of the soil to benefit nickel accumulation.

The presence of intermediate concentrations of calcium, i.e., between about 0.128 mM and about 5.0 mM, increases nickel uptake whereas calcium values of about 0.128 mM and below, or about 5 mM and above, decrease nickel uptake. Combined with an exchangeable Ca:Mg ratio of between about 0.16 and about 0.40, much lower than recommended, an additional increase in nickel concentration in plant tissues is observed. By "exchangeable Ca:Mg ratio" is intended the ratio of extractable calcium and magnesium in the soil.

Although hyperaccumulators such as *Alyssum* have developed the ability to hyperaccumulate metals in above-ground tissues, fertilizer supportive of growth, particularly in polluted soil, can be used as an additive to increase hyperaccumulation. Ammonium fertilizers localize acidification adjacent to the root which aids hyperaccumulation of various metals such as Ni, Zn, Cd, Co, etc. The use of ammonium fertilizers per se is well-known, and acceptable fertilizers and protocols can be readily determined with no more than routine experimentation, by those of ordinary skill in the art. Other additives include, but are not limited to, nutrients such as phosphate which helps to maximize the yield of nickel, for example.

Another possible additive to the contaminated soil is a metal chelating agent. Metal chelates are commonly used in agriculture and occur naturally in living cells. The addition of chelating agents, such as nitrolotriacetic acid (NTA), ethylenediaminetetraacetic acid (EDTA), ethyleneglycol-bis-(p-aminoethylether-N, N-tetraacetic acid) or any of a variety of amino-acetic acids known to those of ordinary skill in the art as chelating agents, to the soil to be phytomined or phytoextracted improves the movement of soil metals to root surfaces for uptake and translocation into above-ground tissues. Preferred chelating agents are NTA or EDTA. Typically, chelating agents will be added at a concentration ranging from about 0.5 to about 10 millimoles per kg soil. As with the use of fertilizers, the optimum concentration of chelating agents can be readily determined with no more than routine experimentation. Chelating compounds which chelate nickel in the presence of high soil levels of Fe, Mg and Ca selectively increase nickel uptake by hyperaccumulator plants.

The following examples are illustrative, but not limiting, of the methods of the present invention. Other suitable modifications and adaptations of the variety of conditions normally encountered which are obvious to those skilled in the art are within the spirit and scope of the present invention.

EXAMPLES

Example 1

*A. murale* 103 plants were grown in sets of two for 120 days in 19 pot-sets (4 L) of contaminated or serpentine soils (Mg-nitrate was leached out) without acidification, the first pot in a set, and with acidification, the second pot in a set. Water was maintained near field capacity by daily watering with deionized water. The plants were cultivated at a temperature of about 28° C. during the day and about 20° C. at night. The soils were acidified using nitric acid and the pH was raised using powdered reagent-grade $CaCO_3$. The soils included serpentine soils rich in nickel (containing from about 100 to about 5000 ppm nickel) obtained from southwest Oregon (soils 3-19), nickel-refinery contaminated Welland loam from Port Colborne, Ontario (soil 1) and nickel-refinery contaminated Quarry muck from Port Colborne, Ontario (soil 2). Fertilizers containing, inter alia, nickel, potassium, sulfur and phosphorous, were added to optimize plant growth.

Table 1 shows the results of the experiment in contaminated soil.

TABLE 1

| Soil | TRT | Final pH | Yield g shoot dry matter/pot | Ni | Co | Mn | Zn | Cu | Fe |
| --- | --- | --- | --- | --- | --- | --- | --- | --- | --- |
| | | | | | | mg/kg | | | |
| 1 | 2 | 5.16 | 27.4 | 9150 | 119 | 82.4 | 117 | 150 | 58 |
| 1 | 6 | 4.96 | 22.7 | 4220 | 84.7 | 145.6 | 180 | 19.5 | 64 |
| 2 | 2 | 6.04 | 40.9 | 4570 | 5.9 | 20.9 | 99.0 | 4.0 | 68 |
| 2 | 6 | 5.40 | 28.8 | 2150 | 7.1 | 63.0 | 142 | 6.5 | 82 |
| 3 | 2 | 6.26 | 21.5 | 6370 | 19.9 | 68.8 | 61.5 | 3.5 | 160 |
| 3 | 6 | 5.38 | 19.7 | 6480 | 308 | 680 | 65.9 | 5.5 | 260 |
| 4 | 2 | 5.61 | 19.6 | 12400 | 56.5 | 181 | 88.0 | 4.0 | 332 |
| 4 | 6 | 5.21 | 15.6 | 8560 | 377 | 140 | 135 | 5.0 | 345 |
| 5 | 2 | 5.88 | 24.0 | 1860 | 6.0 | 53.0 | 252 | 3.2 | 137 |
| 5 | 6 | 5.32 | 21.1 | 1220 | 9.8 | 153 | 379 | 3.5 | 121 |

TABLE 1-continued

| Soil | TRT | Final pH | Yield g shoot dry matter/pot | Ni | Co | Mn | Zn | Cu | Fe |
|---|---|---|---|---|---|---|---|---|---|
| | | | | | | mg/kg | | | |
| 6 | 2 | 6.03 | 24.5 | 4580 | 14.6 | 84.2 | 61.2 | 5.2 | 183 |
| 6 | 6 | 5.42 | 27.2 | 5040 | 58.5 | 227 | 70.3 | 5.5 | 195 |
| 7 | 2 | 5.54 | 23.3 | 5750 | 36.3 | 134 | 83.7 | 5.0 | 250 |
| 7 | 6 | 5.28 | 23.2 | 4870 | 86.8 | 272 | 77.9 | 5.5 | 274 |
| 8 | 2 | 5.77 | 21.1 | 9630 | 28.8 | 130 | 52.6 | 4.0 | 223 |
| 8 | 6 | 5.21 | 17.5 | 7180 | 94.0 | 291 | 74.9 | 4.8 | 221 |
| 9 | 2 | 6.12 | 22.1 | 9770 | 38.7 | 122 | 69.6 | 4.8 | 240 |
| 9 | 6 | 5.62 | 22.5 | 9100 | 196 | 532 | 69.7 | 5.2 | 273 |
| 10 | 2 | 6.25 | 20.0 | 12900 | 31.2 | 109 | 79.3 | 2.5 | 318 |
| 10 | 6 | 5.76 | 19.3 | 11500 | 182 | 774 | 93.5 | 3.2 | 412 |
| 11 | 2 | 5.72 | 32.8 | 8460 | 37.3 | 148 | 75.5 | 5.0 | 266 |
| 11 | 6 | 5.35 | 24.3 | 6010 | 136 | 339 | 93.6 | 4.8 | 230 |
| 12 | 2 | 6.54 | 20.3 | 8070 | 29.0 | 84.4 | 74.0 | 3.5 | 222 |
| 12 | 6 | 5.78 | 18.4 | 8240 | 86.0 | 186 | 66.5 | 3.2 | 178 |
| 13 | 2 | 6.34 | 18.8 | 11000 | 16.2 | 39.1 | 51.8 | 2.2 | 186 |
| 13 | 6 | 5.87 | 19.6 | 9970 | 36.0 | 103 | 56.6 | 2.8 | 181 |
| 14 | 2 | 5.68 | 21.3 | 9150 | 67.0 | 331 | 65.8 | 4.8 | 278 |
| 14 | 6 | 4.84 | 13.3 | 5820 | 313 | 957 | 86.0 | 4.8 | 567 |
| 15 | 2 | 6.04 | 19.4 | 7620 | 30.5 | 142 | 69.8 | 4.8 | 365 |
| 15 | 6 | 5.94 | 23.7 | 6110 | 463 | 820 | 88.6 | 4.8 | 220 |
| 16 | 2 | 6.07 | 21.0 | 3090 | 47.4 | 128 | 89.1 | 6.8 | 172 |
| 16 | 6 | 5.41 | 18.2 | 3560 | 225 | 563 | 105 | 8.0 | 267 |
| 17 | 2 | 6.02 | 20.6 | 9080 | 37.5 | 124 | 114 | 3.8 | 256 |
| 17 | 6 | 5.63 | 23.9 | 7940 | 262 | 973 | 127 | 4.2 | 252 |
| 18 | 2 | 5.99 | 19.4 | 11600 | 35.3 | 127 | 68.5 | 3.0 | 440 |
| 18 | 6 | 5.53 | 15.4 | 9500 | 204 | 908 | 116 | 4.2 | 548 |
| 19 | 2 | 5.59 | 21.8 | 436 | 19.1 | 259 | 92.4 | 7.8 | 190 |
| 19 | 6 | 5.11 | 19.5 | 584 | 72.4 | 929 | 112 | 8.8 | 156 |

"TRT" = treatment. In treatment 2, the soil pH was not adjusted. In treatment 6, the soil pH was acidified.

As illustrated in Table 1, the plants grown on soils of less acidic pH generally accumulated far greater amounts of nickel than the plants grown on more acidic soils. In addition, plants taking up larger amounts of nickel on less acidic soils accumulated smaller amounts of other metals such as cobalt, manganese and zinc which are commonly found in lower concentrations in shoots after soil pH is raised.

Example 2

To validate the above example and to obtain optimization, *Alyssum* plants were grown on nickel-refinery contaminated Welland loam (soil 1), wherein the pH was elevated by applying limestone (Table 2). The plants were also grown on nickel-refinery contaminated Quarry muck (soil 2) and serpentine soils (soils 3-11) (Table 3). The same cultivation conditions recited in Example 1 were used in Example 2.

TABLE 2

Effect of phosphate, pH and Ca:Mg variation on geometric mean shoot yield and micronutrient composition of two *Alyssum* species grown on nickel-refinery contaminated Welland loam (soil 1) for 120 days.

| Soil | TRT | Yield g/pot | Ni g/kg | Co mg/kg | Mn mg/kg | Zn mg/kg |
|---|---|---|---|---|---|---|
| 1 | 1 | 6.68 b* | 7.61 a | 127 a | 23.7 e | 157 fg |
| Phosphate Series: | | | | | | |
| 1 | 3 | 7.82 ab | 5.94 bc | 118 ab | 72.8 c | 209 ab |
| 1 | 2 | 9.78 ab | 5.49 cd | 109 bcd | 59.3 d | 170 def |
| 1 | 4 | 8.71 ab | 6.40 b | 114 a-d | 66.7 cd | 178 c-f |
| 1 | 5 | 8.03 ab | 5.97 bc | 98.8 d | 60.8 cd | 169 def |
| pH Series: | | | | | | |
| 1 | 6 | 8.14 ab | 3.93 e | 132 a | 177 a | 217 a |
| 1 | 7 | 7.46 ab | 4.93 d | 119 ab | 99.8 b | 183 b-e |
| 1 | 2 | 9.78 ab | 5.49 cd | 109 bcd | 59.3 d | 170 deg |
| 1 | 8 | 10.4 a | 8.47 a | 101 cd | 19.1 f | 142 g |
| Ca:Mg Series: | | | | | | |
| 1 | 9 | 9.22 ab | 6.10 bc | 119 ab | 67.3 cd | 168 ef |
| 1 | 2 | 9.78 ab | 5.49 cd | 109 bcd | 59.3 d | 170 def |
| 1 | 10 | 7.80 ab | 5.55 cd | 117 abc | 64.7 cd | 198 abc |
| 1 | 11 | 8.72 ab | 5.85 bc | 120 ab | 69.8 cd | 195 a-d |

*a-g indicate means followed by the same letter are not significantly different at the P < 0.05 level according to the Duncan-Walker K-ratio t-test.
"TRT" = treatment

TABLE 3

Effect of soil treatments on soil pH and micronutrient composition of *Alyssum murale* and *Alyssum corsicum* grown on nickel-refinery contaminated Welland loam (soil 1), nickel-refinery contaminated Quarry muck (soil 2) and serpentine soils (soils 3-11) for 120 days.

| Soil | TRT | Final pH | Cu mg/kg | Zn mg/kg | Co mg/kg | Ni g/kg | Mn mg/kg | Fe mg/kg |
|---|---|---|---|---|---|---|---|---|
| 1 | | 5.47 | 11.0 | 156 | 136 | 8.13 | 39.2 | 67.6 |
| Phosphate Series (phosphate added to the soil in kg/ha by the addition of Phosphate-containg fertilizer): | | | | | | | | |
| 3 | 0 P | 5.23 | 15.0 | 179 | 99.1 | 7.58 | 56.2 | 49.6 |
| 2 | 100 P | 5.18 | 16.0 | 131 | 102 | 7.34 | 59.7 | 50.1 |
| 4 | 250 P | 5.24 | 14.5 | 133 | 82.2 | 7.37 | 56.8 | 56.4 |
| 5 | 500 P | 5.13 | 14.5 | 129 | 73.8 | 6.50 | 53.1 | 50.8 |
| pH Series soil was acidified using nitric acid for "Lo H" and "MLo pH"): | | | | | | | | |
| 6 | Lo pH | 4.99 | 19.2 | 192 | 91.0 | 4.16 | 129 | 53.1 |
| 7 | MLo pH | 5.18 | 16.8 | 160 | 104 | 5.77 | 81.2 | 64.0 |
| 2 | As is pH | 5.18 | 16.0 | 131 | 102 | 7.34 | 59.7 | 50.1 |
| 8 | Limed | 5.57 | 10.1 | 102 | 71.1 | 9.28 | 19.9 | 57.6 |
| Ca:Mg Ratio Series: | | | | | | | | |
| 9 | 1.0 Ca | 5.25 | 17.0 | 134 | 108 | 7.32 | 65.0 | 55.0 |
| 2 | 0 Ca/Mg | 5.18 | 16.0 | 131 | 102 | 7.34 | 59.7 | 50.1 |
| 10 | 2.5 Mg | 5.13 | 17.4 | 152 | 90.4 | 6.75 | 48.9 | 53.0 |
| 11 | 5.0 Mg | 5.04 | 16.2 | 149 | 87.6 | 5.71 | 54.8 | 67.1 |

"TRT" = treatment
"MLo pH" = medium-low pH
The soil designations correspond to the soil designations in Example 1.

The "pH series" experiments demonstrate that the application of limestone increases the uptake of nickel in *Alyssum* so that plant tissues accumulate an increased concentration of nickel.

Example 3

The results show an increase in the geometric mean of nickel uptake in plant tissue by liming *Alyssum* plants cultivated on nickel-refinery contaminated Quarry muck (soil 2) (Table 4) and on nickel-refinery contaminated Welloam loam (soil 1), nickel-refinery contaminated Quarry muck (soil 2) and selected serpentine soils (soils 3-11) (Table 5) from Example 1. The cultivation conditions were the same as those for Examples 1 and 2.

TABLE 4

Effects of soil treatments on the mean concentrations of elements in whole shoots and shoot yield of *Alyssum murale* and *Alyssum corsicum* grown on nickel-refinery contaminated Quarry muck (soil 2) for 60 days.

| Soil | TRT | Treatment | Shoot Yld g/pot | Shoot Ni g/kg | Shoot Co mg/kg | Shoot MN mg/kg |
|---|---|---|---|---|---|---|
| 2 | 1 | None | 8.46 d* | 3.33 abc | 8.62 ab | 27.9 bc |
| Phosphate Series: | | | | | | |
| 2 | 3 | 0 P | 10.78 a-d | 3.24 bc | 5.50 b | 15.0 bc |
| 2 | 2 | 100 P | 12.09 a | 3.23 bc | 5.75 ab | 14.5 bc |
| 2 | 4 | 250 P | 11.53 abc | 3.76 a | 5.50 b | 18.6 bc |
| 2 | 2 | 500 P | 11.86 ab | 3.30 abc | 6.38 ab | 27.7 bc |
| pH Series: | | | | | | |
| 2 | 6 | Lo pH | 12.01 ab | 1.48 e | 10.25 a | 59.8 a |
| 2 | 7 | Med pH | 9.44 bcd | 2.12 d | 6.12 ab | 29.0 b |
| 2 | 2 | As is pH | 12.09 a | 3.23 bc | 5.75 ab | 14.5 bc |
| 2 | 8 | Limed | 11.14 abc | 3.72 ab | 5.88 ab | 13.3 c |
| Ca:Mg Series: | | | | | | |
| 2 | 9 | Ca | 9.08 cd | 3.42 abc | 6.38 ab | 16.3 bc |
| 2 | 2 | As is Ca | 12.09 a | 3.23 bc | 5.75 ab | 14.5 bc |
| 2 | 10 | Med Mg | 11.66 ab | 3.03 c | 4.62 b | 24.9 bc |
| 2 | 11 | Hi Mg | 9.98 a-d | 2.94 c | 5.25 b | 23.3 bc |

*a-e indicate means followed by the same letter are not significantly different at the P < 0.05 level according to the Duncan-Walker K-ratio t-test.
"TRT" = treatment

TABLE 5

Effect of altering nickel-refinery contaminated Welland loam (soil 1), nickel-refinery contaminated Quarry muck (soil 2) and serpentine soils (soils 3-11) by adding phosphate, adjusting the pH or adjusting the Ca:Mg ratio on soil pH, mean yield and micronutrient composition of shoots of Alyssum species grown for 120 days (GM designates geometric mean).

| Soil | TRT | Final pH | GM-Yield g/pot | GM-Ni | GM-Co | GM-Mn | GM-Zn | GM-Fe | GM-Cu |
|------|-----|----------|----------------|-------|-------|-------|-------|-------|-------|
|      |     |          |                |       |       | mg/kg |       |       |       |
| 1 | None | 6.34 | 20.2 | 5460 | 7.6 | 11.9 | 151 | 61 | 4.8 |
| Phosphate Treatments (phosphate added to the soil in kg/ha by the addition of phosphate-containing fertilizer): | | | | | | | | | |
| 3 | 0 P | 6.09 | 41.6 | 4400 | 5.8 | 16.5 | 152 | 56 | 4.2 |
| 2 | 100 P | 6.05 | 42.7 | 4120 | 5.7 | 18.6 | 126 | 57 | 4.5 |
| 4 | 250 P | 6.07 | 49.9 | 4120 | 5.1 | 21.4 | 143 | 57 | 4.8 |
| 5 | 500 P | 5.98 | 46.4 | 3800 | 5.1 | 22.9 | 139 | 54 | 4.2 |
| pH Treatments (soil was acidified using nitric acid for "Lo pH" and "Med-pH") | | | | | | | | | |
| 6 | Lo pH | 5.44 | 32.2 | 2010 | 6.8 | 50.5 | 153 | 68 | 6.4 |
| 7 | Med-pH | 5.76 | 36.1 | 2700 | 4.5 | 21.0 | 143 | 60 | 4.8 |
| 2 | As is pH | 6.05 | 42.7 | 4120 | 5.7 | 18.6 | 126 | 57 | 4.5 |
| 8 | Limed | 6.20 | 40.5 | 4520 | 6.3 | 15.8 | 137 | 55 | 4.1 |
| Ca:Mg Treatments: | | | | | | | | | |
| 9 | 0.0 Ca | 6.13 | 38.6 | 4510 | 6.3 | 16.2 | 135 | 57 | 4.8 |
| 2 | 1.0 Ca | 6.05 | 42.7 | 4120 | 5.7 | 18.6 | 126 | 56 | 4.5 |
| 10 | 2.5 Mg | 5.98 | 39.0 | 4410 | 5.9 | 16.2 | 146 | 63 | 4.6 |
| 11 | 5.0 Mg | 5.91 | 44.0 | 4260 | 5.8 | 18.3 | 158 | 58 | 4.6 |

"TRT" = treatment
The soil designations correspond to the soil designations in Example 1.

Example 4

Novel Hyperaccumulators

The concentration of elements in the shoots of *Alyssum* species grown on a field of serpentine colluvial soil in Josephine County, Oregon, are shown in Table 6 below.

TABLE 6

| Row | Species | Genotype | Block | Zn | P | Cu | Co | Ni | Mn | Fe | Mg | Ca | K |
|-----|---------|----------|-------|-----|------|-----|-----|-------|-----|------|------|------|------|
| 139 | A. corsicum | 16 | 1 | 137 | 5.01 | 9 | 14 | 13400 | 53 | 53.8 | 5.52 | 20.9 | 43.3 |
| 483 | A. corsicum | 16 | 2 | 141 | 4.08 | 8 | 16 | 17500 | 32 | 755 | 5.99 | 24.2 | 44.3 |
| 129 | A. murale | 49 | 1 | 99 | 4.80 | 7 | 12 | 14100 | 41 | 397 | 3.98 | 32.1 | 41.4 |
| 325 | A. murale | 49 | 2 | 106 | 4.63 | 8 | 16 | 17100 | 46 | 455 | 5.32 | 31.7 | 41.7 |
| 135 | A. murale | 54 | 1 | 119 | 4.18 | 5 | 13 | 15600 | 53 | 927 | 4.02 | 25.8 | 44.5 |
| 143 | A. murale | 69 | 1 | 165 | 5.78 | 5 | 16 | 16700 | 53 | 380 | 4.52 | 17.3 | 38.8 |
| 553 | A. murale | 69 | 2 | 191 | 4.97 | 6 | 15 | 13400 | 45 | 616 | 5.66 | 25.4 | 6.16 |

The elements are present in mg/kg amounts.

Whole shoots or side branch samples containing stems and leaves were collected from pots or the field for each genotype, dried in forced air drying ovens and ground with a non-contaminating mill to less than about 0.1 mm. The ground samples were then placed in a borosilicate beaker and ashed at 480° C. overnight. Nitric acid was added to dissolve the resultant ash which was then heated until dry on a hot plate. Hydrochloric acid (3.0 M) was added and the beaker was refluxed for two hours to determine recovered nickel concentration. Concentrations of nickel were measured by an inductively coupled argon plasma emission spectrometer. Low concentrations were measured by atomic absorption spectrometry.

This invention has been described in specific detail with regard to specific plants and methods for increasing metal, such as nickel, uptake via phytomining or phytoextraction. Except where necessary for operability, no limitation to these specific materials is intended nor should such a limitation be imposed on the claims appended hereto. From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. A method for selectively increasing the amount of at least one metal recovered from metal-containing soil consisting essentially of:
   (a) adjusting the pH of the soil from an initial pH to a raised pH of 5.6 to 7.0; and (b) cultivating at least one metal-hyperaccumulator plant in the soil having the raised pH under conditions sufficient to permit said at least one plant to accumulate said at least one metal from the soil in above-ground tissue, wherein the at least one metal-hyperaccumulator plant is a nickel-hyperaccumulator plant that accumulates about 1000 mg or more of nickel per 1 kg dry weight of plant tissue.

2. The method of claim 1, wherein said at least one metal is nickel.

3. The method of claim 1, wherein the pH of the soil is elevated by adding to the soil at least one agent that results in an increase in the soil pH.

4. The method of claim 3, wherein the at least one agent that results in an increase in the soil pH is selected from the group consisting of: limestone, dolomitic limestone, lime, hydrated lime, limestone equivalents, and mixtures thereof.

5. The method of claim 1, wherein said at least one plant is an *Alyssum* plant.

6. The method of claim 5, wherein said *Alyssum* plant is selected from the group consisting of: *A murale, A. pintodasilvae, A. serpyllifolium, A. malacitanum, A. lesbiacum, A. fallacinum, A. argenteum, A. bertolonii, A. tenium, A. heldreichii, A. corsicum, A. pterocarpum, A. caricum* and combinations thereof.

7. A method for recovering nickel from nickel-containing soil consisting essentially of:

(a) adjusting the pH of the soil from an initial pH to a raised pH of 5.6 to 7.0;

(b) cultivating at least one nickel-hyperaccumulator plant in the soil having the raised pH under conditions such that at least 0.1% of the above-ground tissue of said at least one plant, on a dry weight basis, is nickel;

(c) harvesting said at least one plant; and (d) recovering nickel from said harvested plant.

8. The method of claim 7, wherein in step (d), the nickel is recovered by drying and combusting the harvested plant to oxidize and vaporize organic material present.

9. The method of claim 7, wherein said at least one plant is an *Alyssum* plant.

10. The method of claim 9, wherein said *Alyssum* plant is selected from the group consisting of: *A. murale, A. pintodasilvae, A. serpyllifolium, A. malacitanum, A. lesbiacum, A.fallacinum, A. argenteum, A. bertolonii, A. Teniu, A. heldreichii, A. corsicum, A. pterocarpum, A. caricum* and combinations thereof.

11. The method of claim 10, wherein said *Alyssum* plant is selected from the group consisting of: *A. corsicum* G16, *A. murale* G69, *A. murale* G82 and combinations thereof.

12. The method of claim 7, wherein about 2.5% or more of the above-ground tissue of said at least one plant, on a dry weight basis, is nickel.

13. The method of claim 12, wherein about 3.0% or more of the above-ground tissue of said at least one plant, on a dry weight basis, is nickel.

14. The method of claim 13, wherein about 4.0% of the above-ground tissue of said at least one plant, on a dry weight basis, is nickel.

15. A method for decontaminating metal-containing soil, consisting essentially of cultivating at least one hyperaccumulator plant in metal-containing soil, whereby the pH of the soil is maintained between 5.6 and 7.0;

whereby the concentration of metal in the above-ground plant tissue of said at least one hyperaccumulator plant exceeds the concentration of metal in said soil by a factor of at least 2;

wherein the at least one metal-hyperaccumulator plant is a nickel-hyperaccumulator plant that accumulates about 1000 mg or more of nickel per 1 kg dry weight of plant tissue.

16. The method of claim 15, wherein the at least one hyperaccumulator plant exceeds the concentration of metal in said soil by a factor of 3.

17. The method of claim 16, wherein the at least one hyperaccumulator plant exceeds the concentration of metal in said soil by a factor of 4.

18. The method of claim 1, wherein the at least one metal is nickel, wherein said plant further accumulates at least one other metal selected from the group consisting of cobalt, palladium, rhodium, ruthenium, platinum, iridium, osmium, rhenium and mixtures thereof.

19. A method for selectively increasing the amount of at least one metal recovered from metal-containing soil consisting essentially of:

(a) adjusting the pH of the soil from a first pH to a second pH of 5.6 to 7.0; and (b) cultivating at least one metal-hyperaccumulator plant in the soil having the second pH under conditions sufficient to permit said at least one plant to accumulate said at least one metal from the soil in above-ground tissue, wherein the at least one metal-hyperaccumulator plant is a nickel-hyperaccumulator plant that accumulates about 1000 mg or more of nickel per 1 kg dry weight of plant tissue.

20. A method for recovering nickel from nickel-containing soil consisting essentially of:

(a) adjusting the pH of the soil from a first pH to a second pH of 5.6 to 7.0;

(b) cultivating at least one nickel-hyperaccummulator plant in the soil having the second pH under conditions such that at least 0.1% of the above-ground tissue of said at least one plant, on a dry weight basis, is nickel;

(c) harvesting said at least one plant; and (d) recovering nickel from said harvested plant.

* * * * *